United States Patent

[11] 3,590,445

| [72] | Inventor | Walter Heinrich Braun<br>Seebachstrasse 65, 8036 Dresden,<br>Germany |
|---|---|---|
| [21] | Appl. No. | 841,808 |
| [22] | Filed | July 15, 1969 |
| [45] | Patented | July 6, 1971 |
| [73] | | Veb Wasserversorgung und Abwasser-<br>behandlung Dressen, Dressen, Germany |

[54] APPARATUS FOR APPLYING A MORTAR COATING AND TROWELING SAME ON THE INTERIOR WALLS OF PIPE LINES AND ENCLOSED CONDUITS
13 Claims, 9 Drawing Figs.

| [52] | U.S. Cl. | 25/38, 25/32, 25/36 |
| [51] | Int. Cl. | B28b 21/92 |
| [50] | Field of Search | 25/38, 104.5, 32, 36 |

[56] References Cited
UNITED STATES PATENTS

| 2,670,991 | 3/1954 | Perkins | 25/38 X |
| 2,704,873 | 3/1955 | Kirwan et al. | 25/38 |
| 2,839,026 | 6/1958 | Matheny | 25/38 X |
| 2,935,777 | 5/1960 | Perkins et al. | 25/38 |
| 3,167,837 | 2/1965 | Matheny | 25/38 |
| 3,193,901 | 7/1965 | Lee et al. | 25/32 |

FOREIGN PATENTS

| 1,455,675 | 9/1966 | France | 25/38 |

Primary Examiner—J. Spencer Overholser
Assistant Examiner—Ben D. Tobor
Attorney—Nolte and Nolte ABSTRACT: An apparatus for applying a mortar coating and troweling same on the entire circumferential wall, or an part thereof, of enclosed pipes and conduits of varying shape and size. A single drive means conveys the mortar to the distributor head and rotates the distributor head as well as the subsequent troweling assembly. In a preferred embodiment a rotating troweling assembly is replaced by at least one troweling element dragged behind the apparatus moving through the pipe.

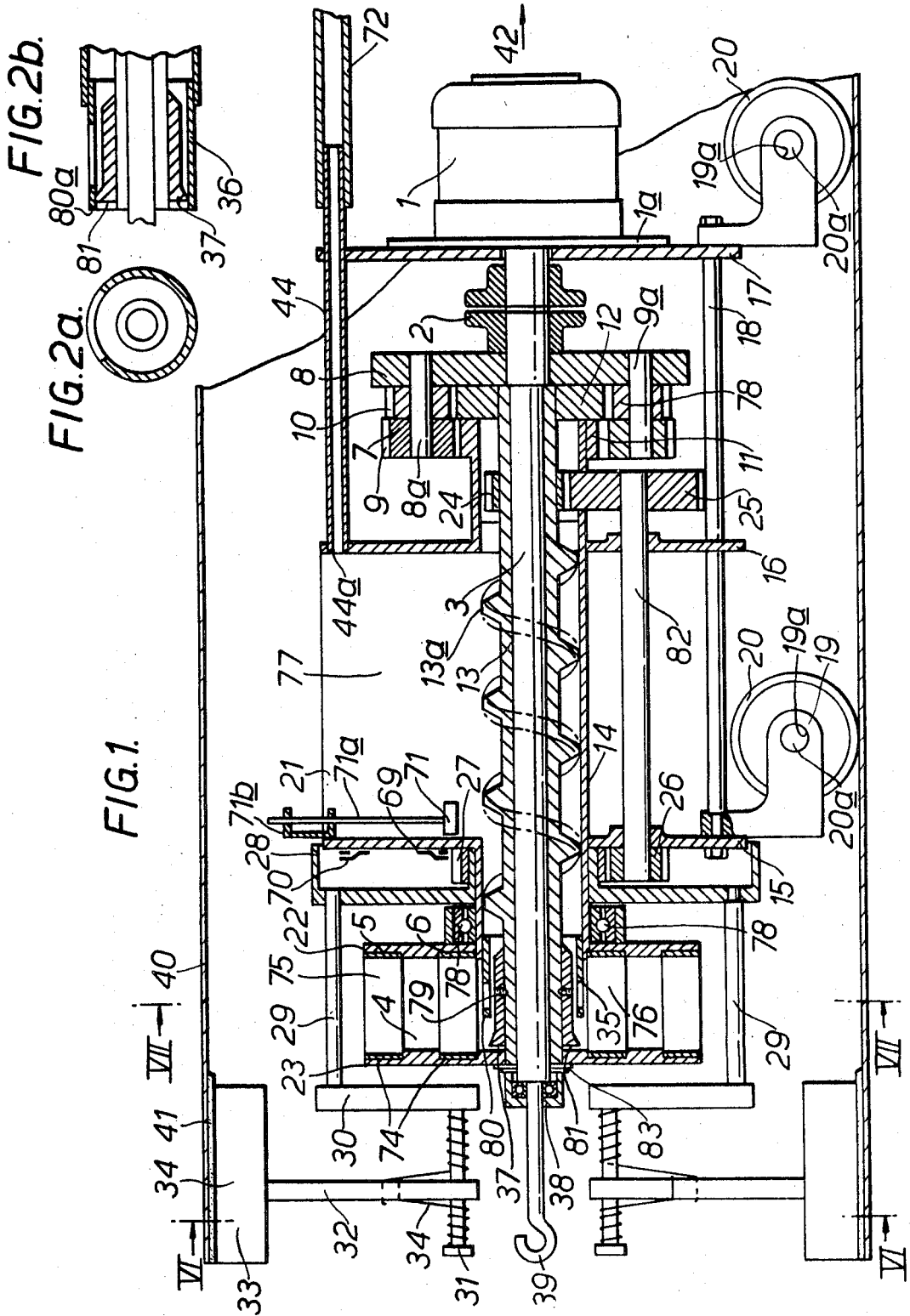

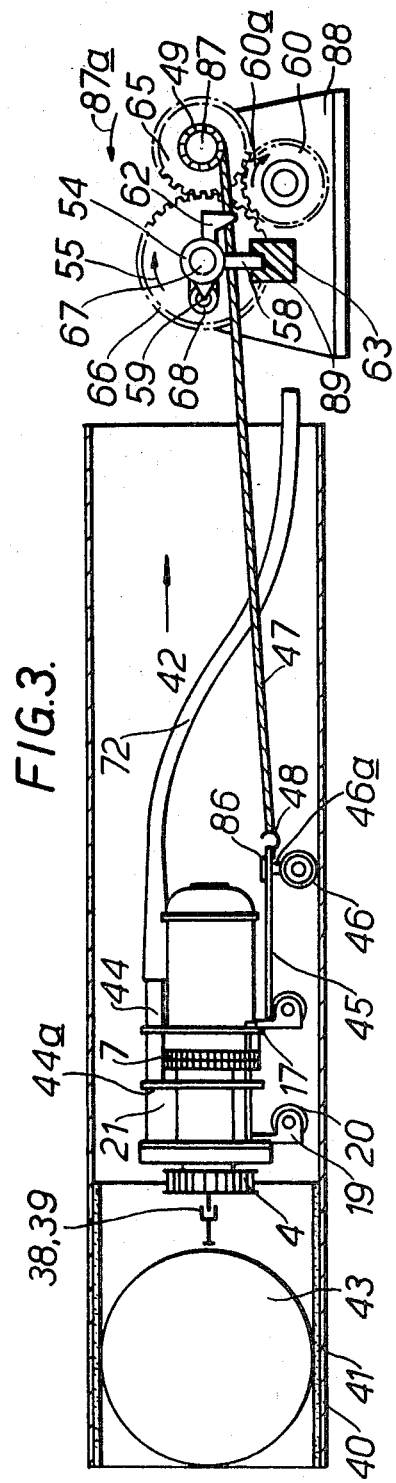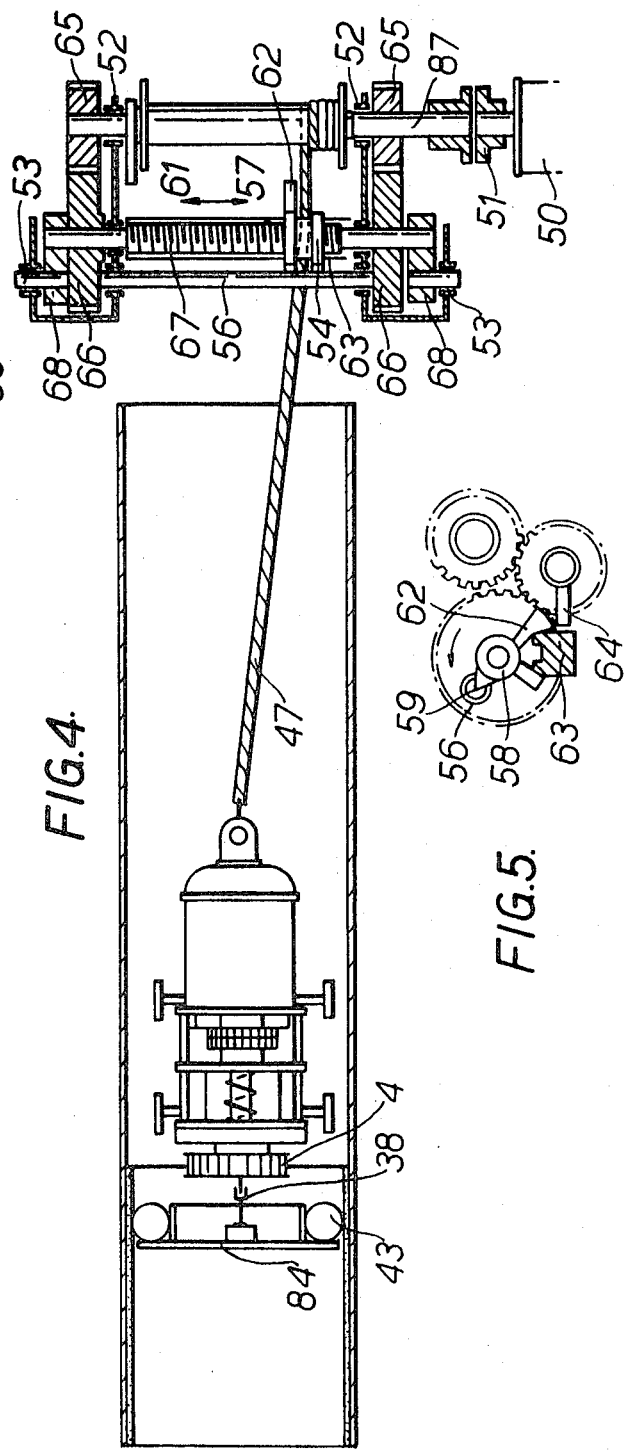

INVENTOR
WALTER HEINRICH BRAUN
BY
NOLTE & NOLTE
ATTORNEY

APPARATUS FOR APPLYING A MORTAR COATING AND TROWELING SAME ON THE INTERIOR WALLS OF PIPE LINES AND ENCLOSED CONDUITS

BACKGROUND OF THE INVENTION

The present invention relates to an apparatus for applying a mortar coating and troweling same on the interior walls of pipelines and enclosed conduits, especially of mains conveying potable water and water for general use. Water mains are attacked and destroyed by corrosion; the interior walls of underground conduits are frequently damaged by abrasion or through chemical agents. A mortar coating provides a protective layer which prevents corrosion, respectively restores worn off material, and thereby extends the service life of the pipe lines and conduits.

DESCRIPTION OF PRIOR ART

Several devices have been developed to coat and subsequently trowel the interior walls of circular pipelines. The state of the art is defined in the following patents:
1. Deutsche Demokratische Republik Nr. 26 442, Kl. 75 a, Gr. 20/01, and
2. Deutsches Reich Nr. 500 687, Kl. 75 c, Gr. 6

Reference is also made to an article "Mechanische und chemische Rohrreinigung und Rohrinnenschutz" by W. Drobeck, published in the magazine "Neue Deliwa", June 1961, pp. 182—191.

The known structures include a number of machines receiving mortar in viscous semisolid form from a pump or a screw conveyor, and discharging same centrifugally by a high speed distributor head, so as to apply a coating of mortar to the interior walls of the pipe. As the machine travels at uniform speed through the pipe, an even coating of mortar is applied to the pipe walls and covers the entire surface throughout the length of the pipe traveled by the machine. In pipes of large cross section the centrifuged mortar coating is troweled and smoothed by rotating troweling blades shortly after the material has been deposited and while it is still in plastic condition; in pipes of smaller diameter (up to 400 mm) an asphalt coating is applied over the mortar so as to obtain the smoothest possible surface.

Conventional machines of this type are suitable for coating the entire interior surface of a circular pipe but are not capable of coating parts of such walls, or of coating pipes of different cross-sectional shape. Conduits are frequently subject to localized wear, particularly in the trough which is damaged by abrasion or chemical agents. If the pipe line or conduit is too small to be walked through, the conventional machines cannot repair a worn surface by the deposition of a new coating. Also, the conventional type of rotating troweling blades requires a reduction gear whose rotary parts are susceptible to trouble, especially under the unprotected conditions prevailing at construction sites. Finally, smoothing or troweling blades made of inelastic material leave traces of spiral unevenness in the surface against which they are applied. The advantages of belt drives, which have sometimes been used, are offset by the disadvantages of slipping under the influence of moisture and stretch.

SUMMARY OF THE INVENTION

It is, therefore, an object of the present invention to overcome and drawbacks of earlier machines an to provide an improved apparatus for applying a mortar coating, and troweling same, on the interior walls of pipe lines and conduits.

Another object is to provide an apparatus whereby a mortar coating may be applied to a predetermined part of the interior wall of a pipe line or conduit and subsequently troweled thereon.

Yet another object is to provide an apparatus for coating and troweling pipes of other than circular cross section.

Another object is to provide a troweling assembly subsequent to a mortar coating assembly dispensing with rotating troweling elements.

A further object is to provide an apparatus wherein all rotatable parts are actuated by a single drive means.

These objects and others which will become apparent hereinafter are attained, in accordance with the present invention, in an apparatus traveling through a pipe to be lined and receiving in a container mounted on the apparatus, a constant flow of a mortar from a remote source. The output of a motor mounted on the apparatus is transmitted to drive, at different speeds, a screw conveyor which feeds the mortar from the container into a distributor head, a rotating distributor head through which the mortar is discharged and centrifuged against the pipe walls, and a rotatable troweling assembly subsequent to the distributor head. The motion of the apparatus through the pipe is governed by a winch, windlassing a cable attached to the forward portion of the apparatus, and steered by mechanical automatic control, so that an even coating is deposited on the walls as the apparatus is pulled along. The presence of a constant and adequate supply of mortar in the container is monitored by a magnetic float therein. At a predetermined minimum level of the supply the magnet energizes an electric relay on the outside of the container for the stopping of the winch until the supply is replenished. At a predetermined maximum level another relay is energized to stop the supply pump temporarily.

The screw conveyor, formed as a hollow shaft concentric with the output shaft of the motor and enclosed in a concentrically disposed conveyor housing, has an unthreaded portion in the region of the distributor head, where it is surmounted by a conical ring to direct the flow of mortar into the center of the distributor head. A guide ring, releasably drawn over the conical ring has, for the total coating of the interior pipe wall, a plurality of radial apertures on its circumference and is so mounted over the conical ring that its rear annular surface is forward of the rear surface of the conical ring, For a partial coating of the pipe wall the guide ring is removed and replaced by another guide ring having only one aperture or cutaway section. In a preferred embodiment the guide ring adapted for partial coating is mounted over the tapered ring as that its rear surface projects backwardly beyond the rear surface of the latter. The size and shape of the cutaway section may be selected under consideration of the dimension of the damaged part of the wall to be renovated in an underground conduit or in a main for potable water or for water for general purposes.

The distributor head comprises two concentric rings mounted between two discs which are disposed perpendicularly to the axis of the motor shaft. The axes of the rings are parallel with the axis of the motor shaft. Each of the rings has a plurality of blades or vanes attached to its circumference and extending outwardly therefrom. The blades of the inner ring are radially arrayed, but the outer ring, which has twice as many blades as the inner ring, has blades tilted at an acute angle relative to the axis of rotation.

In one preferred embodiment of the invention the troweling assembly includes a plurality of adjustable rotatable arms, having sheets of resilient material such as rubber attached to their ends facing the pipe wall. In another preferred embodiment the apparatus includes a deformable hollow body in trailing relation thereto, whose shape is adaptable to the shape of the coated pipe. For a partially coated pipe a profile sheet of resilient material such as rubber may be dragged behind the apparatus, together with biasing means urging the sheet into contact with a correspondingly profiled part of the wall.

The novel features of the apparatus, according to the invention reside in the interchangeability of the guide rings which permit total or partial coating of the pipe walls or conduits, in the provision of two concentric blade rings in distributor head permitting a gradual buildup of the thickness of the deposited mortar, which is particularly advantageous for partially coated walls; in the use of sheets of resilient material at the ends of the troweling arms which eliminate spiral unevenness in the finished coat, and in the provision of trailing deformable bodies or sheets of resilient material in place of rotary troweling devices to reduce the construction costs.

The above and other objects, features and advantages of the invention will become more readily apparent from the following description, reference being made to the accompanying drawing.

BRIEF DESCRIPTION OF THE DRAWING

FIG. 1 is an axial longitudinal cross-sectional view, partly broken away, of an apparatus adapted to coat and trowel the entire interior wall of a pipe or conduit;

FIG. 2a is a cross-sectional view of a guide ring according to a preferred embodiment of the invention;

FIG. 2b is an axial longitudinal view of a guide ring as shown in FIG. 2a;

FIG. 3 is a somewhat diagrammatic side-elevational view of the apparatus according to the invention, including a trailing hollow body and the propulsion system;

FIG. 4 is a plan view of a modification of the invention shown in FIG. 3;

FIG. 5 is a side-elevational view of a detail shown in FIG. 3, somewhat enlarged;

DESCRIPTION OF THE PREFERRED EMBODIMENTS

Figure 6:
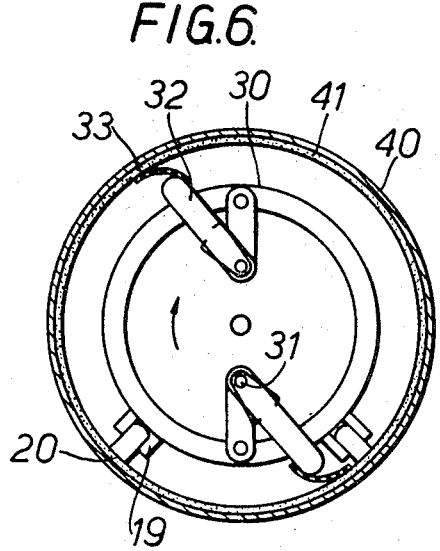
FIG. 6 is a cross-sectional view taken along the line VI–VI of FIG. 1.

In FIG. 1 there is shown a chassis 77 movable on wheels 20 in the longitudinal direction of a pipe 40. A high-speed electric motor 1 is mounted at the forward end of the chassis 77 on a mounting flange 1a and connected via a coupling 2 to a rotatable shaft 3. Shaft 3 which extends longitudinally through the entire chassis and which is disposed coaxially with the pipe 40 being coated, is connected with a releasably mounted distributor head 4 at the rear end of the chassis 77.

On the output portion of coupling 2 shaft 3 is connected to a driving sun gear 8, forming part of a speed reduction gear in the form of a planetary gear 7, and including the driven planetary gears 9 and 10 journaled on an axial shaft 9a which is parallel aligned with the longitudinal direction of shaft 3. The planetary gear 10 meshes with a spur wheel 12. It is to be understood that the illustrated planetary gear 7 is by way of an example only, and may be replaced by any other suitable type of speed reduction gear adapted to vary the motor output.

The portion of shaft 3 intermediate the output portion of the reduction gear 7 and the forward portion of the distributor head 4 is encased in a hollow shaft 13, having external threads 13a and being formed as a screw conveyor concentric with shaft 3. The screw conveyor 13 is fixedly connected to spur wheel 12 of the planetary gear system 7. The shafts 3 and 13 are concentrically surrounded by a housing 14 having an annular shape.

Flanges 15, 16 and 17 are fixedly attached to the housing 14, in spaced relationship, perpendicular to its longitudinal axis, and are interconnected portion an rods 18 extending parallel to the longitudinal axis of the housing. Rods 18 support at each of their 15, ends 19 form from from one leg of an angle bracket 19 depending on a downward direction. The other leg of each angle bracket 19 has in its forward portion an opening 19a through which the axle 20a of wheel 20 is directed. The flanges 15, 16, 17, the angle brackets 29 and the wheels 20 from substantially the support of the chassis 77; the flanges 15 and 16 define in their upper portions the area of a mortar container 21, formed form metal sheets joined to the flanges, into which mortar is delivered via the orifice 44a at the upper end of flange 16, by a supply pipe 44 connected to a flexible hose 72, form a pump remote from the apparatus (not shown).

A magnetic float 71 is movably suspended in the container 21 on a rod 71a which has a handhold 71b. The float is adapted to activate a low-volume control 69, respectively a high-volume control 70, formed as electric switches on the outside of the container 21; whenever the quantity of mortar in the container exceeds predetermined boundary conditions the switches are adapted to actuate volume-equalizing controls.

The rotatable distributor head 4 is supported in ball bearings 78 mounted on housing 14 and centered on the axis of shaft 3. The distributor head itself is formed by two parallel discs 22, 23, of which disc 22, proximate to the motor, is coextensive with the annular end face of the housing 14. The discs have in their confronting faces recesses 74 for the support of two concentric blade or vane rings 5, 6. Ring 6 has on its circumference a plurality of blades 76 extending radially outwardly therefrom. Ring 5, comprising the outer ring, has on its circumference twice the number of blades 75 than are attached to the inner ring 6, the blades 75 projecting outwardly from the circumference at an acute angle relative to the axis of rotation.

Figure 7:
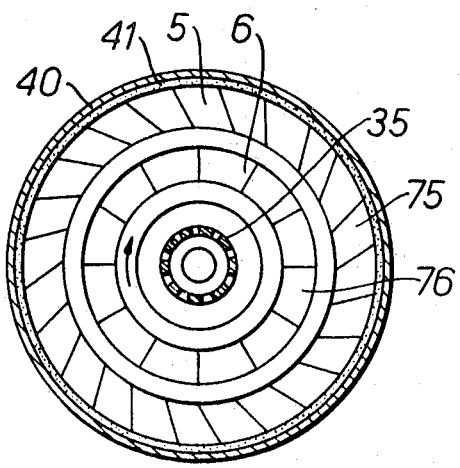
FIG. 7 is a cross-sectional view taken along the line VII–VII of FIG. 1.

The threaded portion of the screw conveyor 13 extends toward the disc 22 of the distributor head 4. In the region of the distributor head and continuing to the rear end of chassis 77 shaft 3 is surrounded by an unthreaded portion of the conveyor 13. Between the discs 22 and 23 the smooth tubular section of conveyor 13 is surmounted by a conical ring 37, fixedly attached thereto by fasteners 79. According to the embodiment shown in FIG. 1, a guide ring 35 is pushed over the conical ring and releasably formfitted against the inner wall of the housing 14 proximate to its end portion. Guide ring 35, which has a plurality of radial apertures (cf. FIG. 7) and which is adapted to be used for coating the entire pipe wall, is advantageously located, with respect to the conical ring 37, so that its end 80 is slightly displaced in a forward direction with respect to the end 81 of ring 37. For partial coating of a pipe, guide ring 35 is replaced by a guide ring 36 of the type shown in FIGS. 2a and 2b, having one radial aperture of predetermined size and shape. In a preferred embodiment guide ring 36 is releasably mounted over the conical ring 37 so that its end 80a is slightly displaced in a rearward direction with respect to the end 81 of the ring 37.

A reduction gear system intermediate the screw conveyor 13 and the troweling assembly 34 is formed by interconnected elements including a toothed wheel 24 engageable by the screw threads of the screw conveyor 13 and rotatable perpendicular to the axis of the screw conveyor, a toothed wheel 25 meshing with wheel 24 and coaxially connected with another toothed wheel 26 on shaft 82, a toothed wheel 27 engageable by wheel 26 and engaging a U-shaped disc 28 for rotation about the housing 14. The rotation of disc 28 is transmitted through pivoted links 29, 30 and spring-biased bolts 31, supported at one of their ends in the links 30 and extending coaxially with shaft 3, to a pair of arms 32 extending resiliently outward in a radial direction from spring bolts 31. At their outermost ends the arms 32 are provided with sheets or pads 33 made of resilient rubberlike material, and adapted to be in sliding pressure contact with the mortar coating 41 deposited on the interior surface of pipe 40, as the chassis 77 moves through the pipe.

Shaft 3 is connected via ball bearings 38, mounted on end flanges 83 on the rear portion of the chassis 77, to hook means 39 for attaching a cable or pull cord. In the view shown in FIG. 3 the troweling assembly 34 is dispensed with; instead, a deformable hollow body 43, made of resilient rubberlike material is connected to the chassis 77 by linking means 38, 39. According to the view of FIG. 4 two hollow deformable bodies 43 are urged into pressure contact with the pipe walls 40, respectively with the mortar coating 41 on the walls by a mounting device 84 extending across the width of the pipe in normal direction with respect to the axis of shaft 3.

In the direction of travel of the apparatus indicated by the arrow 42 in FIG. 3, the apparatus is provided with an extension formed by the spur 45 attached to the flange 17. A bracket 86 is fixedly attached to spur 45 and supports the axle shaft 46a of a wheel 46. A hook 48 at the forward end of spur 45 is adapted to secure one end of a cable 76 which, at its other end, it attached to a winch 49 to be wound thereon, so as to draw the apparatus through the pipe 40. Winch 49 is mounted on a shaft 87 which is connected by the coupling 51 with drive means 50 such as motor. The shaft 87 is supported in bearings 52 at opposite ends of the winch 49. A toothed wheel 65 is attached coaxially on each end of the shaft 87, on its extension beyond the bearings 52. A support 63 on a base 88, in parallel alignment with shaft 87, carries a shaft 67 formed as a screw drive and swingably supported by levers 68 in bearings 53. A toothed wheel 66 is attached to each end of the screw drive shaft 67 coaxially therewith. A transport nut 54 for guiding the cable 47 has screw means for threadedly engaging the screw drive 67 during rotation thereon. Cam means 59, 60 and a cam follower 62 are radially attached to the screw drive at its outer end, proximate to the toothed wheel 66, which is coplanar with, an engageably by toothed wheel 65. A shaft 56, disposed parallel with shafts 67 and 87, is swingably supported on levers 68 in bearings 53, mounted on the base 88. AT opposite ends of the shaft 56 toothed wheels 66 are coaxially attached. A rotary cam 68 is mounted on shaft 56 proximate to the toothed wheel 65.

Figure 8:
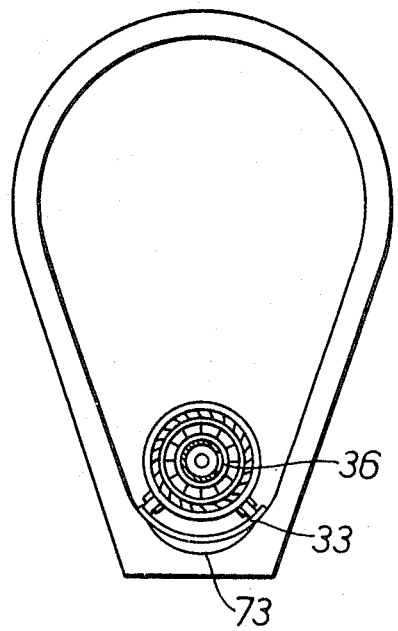
FIG. 8 is a cross-sectional view through a conduit including a distributor head adapted for partial coating of the interior wall, and trailing troweling sheets.

In operation, mortar in a viscous or plastic condition is delivered from a source by a pump (not shown) and fed through a flexible hose 72 connected to a rigid supply pipe 44 through an aperture 44a into a container 21 mounted on the chassis 77. A screw conveyor 13 driven by motor means 1 and 3, advances the mortar from the container 21 to a distributor head 4 through a conduit formed between the outer surface of the screw conveyor and the inner surface of a housing 14 surrounding the screw conveyor. The mortar is directed into the distributor head 4 by a conical section of the screw conveyor formed by a ring 37 fixedly mounted thereon, and forced outwardly in a radial direction through apertures provided in an annular surface 35, respectively 36, surrounding the conical ring. The mortar is picked up by the blades 76 of the rotating ring 6, transferred in a generally radial direction therefrom onto the blades 75 rotating with ring 5, and thrown by centrifugal force against the circumferential portion of the pipe wall substantially coplanar with the extension of rings 75, 76. Arms 32, rotatable via a transmission gear and linking means, by screw conveyor 13, are disposed subsequent to the distributor head 4 and have at their ends proximate to the pipe wall 40, sheets 33 of resilient rubberlike material. As the chassis 77 moves through the pipe, the arms 32 resiliently mounted in radial direction execute a spiraling sliding motion against the coated pipe wall (cf. FIG. 6) to smooth the deposited mortar. In an alternate embodiment the trowling assembly comprises a hollow deformable body 43 of sheets of resilient rubberlike material suitably profiled 33 (cf. FIG. 8) trailed by the apparatus and urged into pressure contact with the corresponding pipe walls, such as 73.

To propel the apparatus, the winch 49, rotatable by motor means 50 on a shaft 87, is turned in the direction of the arrow 87a, winding a cable 74 which is connected to the forward part of the chassis 77. A cable-guiding transport nut 54 on the screw drive 67 moves, according to the view of FIG. 4, in the direction of the arrow 57. The screw drive 67 is directed to move in this direction by the engagement of the toothed wheel 66 mounted thereon, with the toothed wheel 65 turning with the shaft 87, and rotating in the direction of the arrow 55, until the transport nut 54 abuts against the toothed wheel 66 at the end of the screw drive 67. Depressed by the weight of the transport nut 54 at that point, the screw drive 67 sags, whereby cam 58 is forced downward and received in a recess 89 formed in the support 63 at its outer end. The downward motion of the screw drive 67 releases the toothed wheels 66 out of engagement with the wheels 66 and brings them into meshing engagement with the toothed wheels 60, rotating in the direction of arrow 60a because of their engagement with the wheels 65. The engagement of the wheels 66 by the wheels 60 reverses the rotational direction of the former, whereby the direction of travel of the screw drive 67 and of the transport nut is changed, into the direction indicated by the arrow 61. As the transport nut 54 arrives at the wheel 66 at the opposite end of the screw drive 67 cam 64 on the shaft 56 engages the cam follower 62 on the screw drive 67, whereby the toothed wheel 66 are lifted out of engagement with toothed wheels 60 and reengaged with wheels 56, so that the direction of rotation, respectively the direction of travel, is again reversed.

The level of the mortar in the container 21 is kept substantially constant by the monitoring magnetic float 71 movable in the container. If the level rises above a predetermined height, the juxtaposition of the magnetic float on the inside, and a suitable electric switch 70 on the outside of the container activates a relay temporarily stopping the pump; conversely, if the level falls below a predetermined height a low-level electric switch 69 on the outside of the container activates a relay arresting the rotation of the winch 49 and of the distributor head. These control means provide for an even distribution of a mortar coating of substantially uniform thickness.

The invention described and illustrated is believed to admit of many modifications within the ability of persons skilled in the art, all such modifications being considered within the spirit and scope of the appended claims.

What I claim is:

1. An apparatus for applying a coating material to the interior wall of an enclosed pipe and troweling same, comprising:

A frame adapted to move longitudinally through said pipe, a container mounted on said frame and having a supply of coating material therein, a motor mounted on said frame having a motor shaft extending substantially coaxially with said pipe, a distributor head for discharging said coating material in the direction of said wall, conduit means connecting said container and said distributor head, means for moving said coating material through said conduit means, a troweling assembly for smoothing said coating material on said wall subsequent to the deposition thereof, means for actuating said troweling assembly, a screw conveyor formed as a hollow shaft substantially concentric with said motor shaft having a threaded portion in the region outside said distributor head means linking said screw conveyor with said troweling assembly, a housing surrounding said screw conveyor and connecting said container and said distributor head and forming a conduit with said screw conveyor for said coating material, a conical ring secured to said screw conveyor in the region of said distributor head and having an apex in the direction of said motor, and a ring surrounding said conical ring in said region and concentric therewith and spaced therefrom, said ring being releasably attached to the end of said housing extending toward said distributor head and comprising at least one radial aperture whereby coating material conveyed by said screw conveyor is directed toward said distributor head.

2. An apparatus as defined in claim 1 comprising a plurality of radial apertures spaced about the annular surface of said ring.

3. An apparatus as defined in claim 1 comprising a first speed reduction gear intermediate said motor shaft and said screw conveyor, and as second speed reduction gear intermediate said screw conveyor and said troweling assembly, whereby said troweling assembly and said screw conveyor are adapted to be rotatable at different speeds relative to one another and to the speed of said distributor head.

4. An apparatus as defined in claim 1 wherein said distributor head comprises two parallel discs releasably attached to said motor shaft and extending in a direction perpendicular thereto, one of said discs being coextensive with the end portion of said housing and the other of said discs being spaced therefrom, said discs being formed with a pair of parallel recesses in each of their confronting walls, two rings concentrically mounted in said recesses between said disc and coaxial therewith, one of said rings forming an inner ring and having a first plurality of blades attached on its circumference extending radially therefrom in an outward direction, and the other of said rings forming an outer ring including a second plurality of blades, said blades of said outer ring extending outwardly from the circumference thereof tilted at an acute angle relative to the axis of rotation.

5. An apparatus as defined in claim 1 comprising means for moving said frame, said means comprising motor means remote from said frame, a first shaft connected to said motor means, a winch rotatable on said shaft by said motor means, a cable connecting said winch and said frame, a first pair of toothed wheels fixedly attached to said first shaft at opposite ends of said winch and coaxial therewith, an assembly comprising a second shaft and a third shaft swingably supported in bearings in parallel alignment relative to one another and to said first shaft, a hollow screw drive on said second shaft, a cable-guiding transport nut threadedly movable on said screw drive, a second pair of toothed wheels fixedly attached at opposite ends of said second shaft proximate to said screw drive and coaxial therewith, a plurality of rotary cams attached to said screw drive adjacent to said second toothed wheels and cam engaging means spaced therefrom, a third pair of toothed wheels on said third shaft meshing with said first pair of toothed wheels, said second pair of toothed wheels being movable, together with said screw drive, between a first position engaging said first pair of toothed wheels and a second position engaging said third pair of toothed wheels upon cooperation of said cams and said cam engaging means, whereby the direction of travel of said transport nut on said second shaft is reversed.

6. An apparatus as defined in claim 1 comprising a sensor in said container responsive to the volume coating material therein, and control means adapted to regulate said volume upon signals received from said sensor.

7. An apparatus as defined in claim 6 wherein said sensor is a floating magnet movable in said container, and said control means comprise electric switch on the outside of said container, energizable by said magnet at predetermined positions for actuating volume-regulating means.

8. An apparatus as defined in claim 1 comprising a source for said material remote from said frame, conduit means for said material between said source and said container, and means for conveying said material through said conduit means.

9. An apparatus as defined in claim 1 wherein said conduit means comprise hose mean and said conveying means comprise a pump remote from said apparatus.

10. An apparatus as defined in claim 1 comprising a coupling intermediate said motor and said motor shaft.

1. An apparatus for applying a coating material to the interior wall of an enclosed pipe and troweling same, comprising a wheeled frame adapted to move longitudinally through said pipe, a container mounted on said frame for holding a supply of coating material, a distributor head for discharging said coating material in the direction of said wall, conduit means between said container and said distributor head, means for moving said coating material through said conduit means, a troweling assembly for smoothing said coating material on said wall subsequent to the deposition thereof, a motor, a motor shaft connecting said motor and said distributor head, said shaft extending in a substantially straight line through said frame coaxially with said pipe, a screw conveyor formed as a hollow shaft concentric with said motor shaft, having a threaded portion in the region outside said distributor shaft, an annular housing surrounding said screw conveyor connecting said container and said distributor head and forming conduit means with said screw conveyor for said coating material, a conical ring concentric with said screw conveyor and secured thereto in the region of said distributor head, a ring concentric with said screw conveyor spaced from and surrounding said conical ring in said region, said ring being releasably attached to the end of said housing extending toward said distributor head and having at least one radial aperture whereby coating material conveyed by said screw conveyor is directed toward said distributor head, said troweling assembly comprising at least one smoothing element adapted to be pulled behind said moving frame, means connecting said element and said frame, and means for urging said element against the circumferential area of said coated wall.

12. An apparatus as defined in claim 11 wherein said smoothing element is a hollow body made of resilient rubberlike material conformable with the cross-sectional dimensions of said wall, and wherein said connecting means include a rod bearing means intermediate the end of said motor shaft remote from said motor and said rod, hook means on said rod, and pull means connecting said hooked rod and said hollow body.

13. An apparatus as defined in claim 11 comprising at least one profiled solid body made of resilient rubberlike material and adapted to be forced by said urging means against a section of said wall.